(12) United States Patent
Berthold et al.

(10) Patent No.: US 6,204,345 B1
(45) Date of Patent: Mar. 20, 2001

(54) SUSPENSION POLYMERIZATION FOR PREPARING POLYOLEFINS

(75) Inventors: Joachim Berthold, Kelkheim; Ludwig Böhm, Hattersheim; Johannes Friederich Enderle, Frankfurt; Rainer Münnig, Idstein; Paul-Richard Schöneborn, Kriftel, all of (DE)

(73) Assignee: Hostalen Polyethylen GmbH (DE)

( * ) Notice: Subject to any disclaimer, the term of this patent is extended or adjusted under 35 U.S.C. 154(b) by 0 days.

(21) Appl. No.: 09/156,947

(22) Filed: Sep. 18, 1998

(30) Foreign Application Priority Data

Sep. 26, 1997 (DE) .............................. 197 42 507

(51) Int. Cl.⁷ ...................................... C08F 2/14
(52) U.S. Cl. ................ 526/70; 526/65; 526/67; 526/88; 526/348.6
(58) Field of Search ................. 526/65, 70, 88, 526/67, 68, 348.6

(56) References Cited

U.S. PATENT DOCUMENTS

| 3,126,365 | * | 3/1964 | Hooker | 526/70 X |
| 3,502,633 | * | 3/1970 | Schwaar et al. | 526/70 |

FOREIGN PATENT DOCUMENTS

| 561782 | 4/1963 | (BE) . |
| 570514 | 2/1959 | (CA) . |
| 653951 | 12/1962 | (CA) . |
| 1420678 | 11/1968 | (DE) . |
| 1520556 | 4/1969 | (DE) . |

OTHER PUBLICATIONS

Database WPI, Section Ch, Week 9731, Derwent Publications Ltd., London, GB; Class A17, AN 97–337077, XP 002089173.
Chem. Zentralbl. 1964/Heft—25/26.
Chem. Zentralbl. 1965/Heft—5.
Chem. Zentralbl. 1964/Heft—47.

* cited by examiner

*Primary Examiner*—Fred Teskin
(74) *Attorney, Agent, or Firm*—Connolly Bove Lodge and Hutz LLP

(57) ABSTRACT

The novel process for preparing ethylene copolymers by polymerizing ethylene with, as comonomer, up to 10% by weight, based on the total amount of the monomers, of a 1-olefin of the formula $R—CH=CH_2$, where R is a straight-chain or branched alkyl radical having from 1 to 4 carbon atoms, is carried out in a polymerization reactor and in suspension with a dispersion medium at a temperature of from 20 to 100° C. and a pressure of from 2 to 20 bar, in the presence of a catalyst. The dispersion medium is then separated from the polymer. After carrying out the polymerization, but before removing the dispersion medium from the polymer, the suspension stream is partly evaporated, with the result that some of the wax formed in the polymerization is adsorbed onto the polymer and the resultant vapor stream is fed directly into the reactors after condensation or back into the process after distillative removal of the comonomer.

18 Claims, 2 Drawing Sheets

SUSPENSION POLYMERIZATION FOR PREPARING POLYOLEFINS

The invention relates to an olefin polymerization process for preparing ethylene copolymers by polymerizing ethylene with, as comonomer, up to 10% by weight, based on the total amount of the monomers, of a 1-olefin of the formula R—CH=CH$_2$, where R is a straight-chain or branched alkyl radical having from 1 to 4 carbon atoms, in a polymerization reactor and in suspension with a dispersion medium at a temperature of from 20 to 100° C. and a pressure of from 2 to 20 bar, in the presence of a catalyst, followed by separation of the dispersion medium from the polymer, and with reduced production of wax, and in which there is selective precipitation of wax onto the polymer, giving improved yield.

Olefin polymerization is a structure-building reaction which—starting with the monomer via oligomeric compounds—finally forms the high-molecular-weight polyolefins. Because of its nature, the reaction always gives a distribution of molecular weights including, even if in small amounts, low-molecular-weight constituents, i.e. oligomeric compounds with chain lengths of up to 60 carbon atoms.

It is known that these "waxy constituents" remain on the grains of the polymeric product in polymerization processes carried out in the gas phase. However, in polymerization processes conducted, in contrast, in a dispersion medium, the low-molecular-weight polymeric compounds become dissolved to some extent in the dispersion medium.

Suspension polymerization processes are operated with a "high-boiler" as dispersion medium. Commonly used dispersion media are petroleum cuts with a boiling point of above 60° C. (at 1 bar), such as hexane, isooctane, nonane, etc. In the suspension polymerization process, the polymer is mechanically removed from the dispersion medium after the polymerization reaction. Some portion of,. or all of, the dispersion medium used is reintroduced into the polymerization reactors. The portion of the dispersion medium which, if desired, is not reintroduced into the reactors is generally regenerated by distillation, during which the dissolved waxy constituents appear as a paste-like to solid residue which has to be disposed of.

However, there are also versions of the process in which, during the subsequent course of the process, the wax removed by distilling the dispersion medium is, for example, sprayed onto the product and utilized together therewith. However, in particular for high-quality products, this measure has an adverse effect on processing and quality.

A further difficulty is that in the case of polymerizations which are carried out continuously certain polyolefin product types can be prepared only using two reactors connected in series, in which different reaction conditions are established. The reaction rich in comonomer is generally carried out in the second reactor. The manner of interconnection of the apparatus and the requirements of the mixing specification make it essential to discharge a high proportion of dispersion medium out of the polymerization process and to regenerate the same by distillation. One of the results of this is that a considerable amount of wax is produced, and this can be up to 3% by weight of the starting materials.

The wax which is discharged comprises, inter alia, polymer molecules with chain lengths above C-24, preferably above C-30 and in particular above C-40, which can be processed with the high-molecular-weight polymer in downstream application sectors, without sacrificing quality. However, those oligomeric compounds with a chain length of up to C-24 have proven disadvantageous for the processing stage.

The object of the invention is to find a process for removing these oligomers up to a chain length of 24 carbon atoms.

The invention relates to a process of the type mentioned at the outset which comprises, after carrying out the polymerization and before removing the dispersion medium from the polymer, partly evaporating the suspension stream, with the result that some of the wax formed in the polymerization is adsorbed onto the polymer, and feeding the resultant vapor stream directly into the reactors after condensation or back into the process after distillative removal of the comonomer.

Surprisingly, it has been found that in the novel process the fractions of wax produced which, although dissolved by the dispersion medium, do not bring about a reduction in quality, are adsorbed onto the polymer, thus increasing the yield of the process and reducing the need to dispose of wax.

The adsorbed wax fractions are generally composed of oligomers above C-24, but preferably of oligomers above C-30 and in particular above C40.

During the partial evaporation, from $\frac{1}{5}$ to $\frac{1}{2}$ of the dispersion medium, preferably from $\frac{1}{4}$ to $\frac{1}{3}$ of the dispersion medium used in the process, is generally drawn off in the vapor stream as vapor.

The evaporation preferably takes place at reduced pressure, and the pressure during the evaporation is from 0.1 to 0.8 bar, in particular from 0.3 to 0.5 bar.

The novel polymerization uses, as comonomer, a proportion of up to 10% by weight, based on the total amount of the monomers, of a 1-olefin of the formula R—CH=CH$_2$, where R is a straight-chain or branched alkyl radical having from 1 to 4 carbon atoms. Comonomers of preferred suitability are butene, pentene, hexene and 4-methyl-1-pentene.

In order to avoid impairing the properties of the end product, care must be taken at the start of the polymerization, i.e. in the first reactor, that a possible comonomer concentration which may in some circumstances find its way into the reactor via regenerated dispersion medium does not exceed 0.04% by weight at a pressure of 8 bar and a temperature of 80° C. The comonomer concentration is generally from 0 to 0.04% by weight, preferably from 0 to 0.03% by weight.

The novel process contributes to increased cost-effectiveness of the polymerization process for polyolefins and to reduction of environmental pollution via lower amounts of wax for disposal. Since disposal also gives rise to considerable costs, cost-effectiveness is further increased by producing lower amounts of wax.

The dispersion media used in the novel process are cuts from a fraction of saturated hydrocarbons with a boiling point (at 1 bar) of above 60° C. Examples of these are hexane, isooctane, nonane and others.

The novel process is described below in greater detail using FIGS. 1 and 2.

Figure 1:
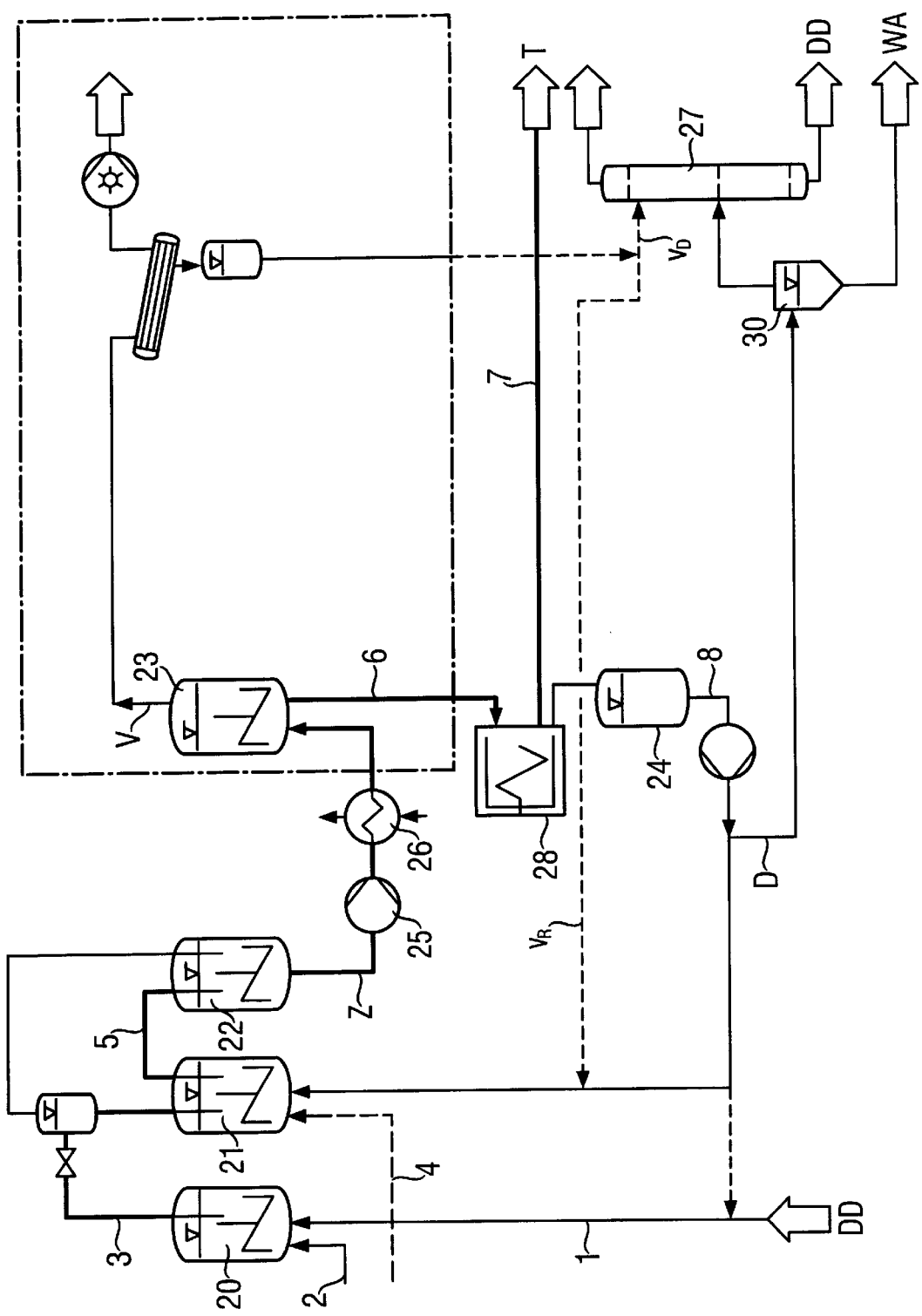
FIG. 1 shows a flow diagram of the novel suspension polymerization process using hexane as "high-boiling" dispersion medium and butene as comonomer.

The monomeric ethylene and hydrogen are fed to the first reactor 20 via piping 2, and the dispersion medium via piping 1. In order to avoid lowering the stress cracking resistance of the end product, the butene concentration at a pressure of 8 bar and a temperature of 80° C. must not exceed a limit of 0.04% by weight. It is generally from 0 to 0.04% by weight, preferably up to 0.03% by weight. In order to be able to comply with this limit, deriving from the mixing specification, for butene concentration in the first reactor 20, regenerated dispersion medium (DD) is introduced into the first reactor 20. The reduction in butene in the dispersion medium (DD) during the part-evaporation in the receiver 23 allows wax-containing mother liquor to be conducted directly into the first reactor 20 from the collecting vessel 24.

From the first reactor 20, the reaction mixture passes via piping 3 into the second reactor 21, where further polymerization is carried out in a butene-rich dispersion medium.

The butene may be fed to the second reactor 21 as fresh material via piping 4 and/or in the form of recirculated mother liquor comprising butene and wax and coming from the collecting vessel 24. The butene concentration deriving from the mixing specification must be taken into account here.

It is also possible for the dispersion medium used in the first reactor 20 to be composed of recycled hexane, which may, if desired, also comprise butene. Here, too, attention- .has to be paid to the butene content during transfer into the first reactor 20.

The butene needed for the polymerization in the second reactor 21 is supplied with the mother liquor from the collecting vessel 24 or in the form of a wax-free, butene-rich dispersion medium condensate from the vapors (V) from the receiver 23 for the decanter or as fresh material via piping 4. The suspension stream (Z), composed of solid polymer, dispersion medium with, dissolved therein, unconverted monomers and wax passes via piping 5, the after-reactor 22, in which a pressure of 1.5 bar and a temperature of 60° C. are established, a pump 25 and a heat exchanger 26 into the receiver 23 for the decanter, where the selective precipitation of wax onto the polymer takes place by partial evaporation at a reduced pressure of 0.32 bar and a temperature of 35° C.

This can be carried out adiabatically utilizing the latent heat of the suspension stream, with evaporation of the "low-boiling" monomers and of some portion of the dispersion medium. The resultant vapor stream (V) is wax-free and comonomer-rich.

The process of concentration of the dispersion medium with, at the same time, cooling in the receiver 23 for the decanter causes precipitation of the dissolved high-molecular-weight wax fractions, and during this the hydrocarbons with a chain length above C-24, preferably above C-30 and in particular above C-40, is adsorbed onto the solid polymer.

The suspension stream passes from the receiver 23 for the decanter via piping 6 into the decanter 28, and is separated into mother liquor and polymer. The moist polymer from the decanter, which after removal of the mother liquor still has from 20 to 30% by weight of residual moisture, is conducted to the dryer T, not included in the diagram, via piping 7, and after stabilization is pelletized.

The dispersion medium removed (mother liquor) is depleted with respect to comonomers; it is recirculated into the polymerization process via piping 8. A small stream (D) of wax-containing dispersion medium, of the order of magnitude of from 5 to 12%, based on the stream (Z), is regenerated in the evaporator 30 by distillation, removing all of the dissolved waxy compounds (WA). This limits the level of low-molecular-weight waxy fractions (e.g. molecules with a chain length below C-24) in the dispersion medium distillate (DD). Some or all of the vapor return stream (stream V) into the process can be fed back into the second reactor 21 (stream VR). If some is returned, the remainder of the stream (VD) is fed to the dispersion medium distillation column 27 for butene removal.

This process achieves a higher return of wax-containing dispersion medium into the polymerization reactors 20 and 21 and, at the same time, maintains the reaction conditions required for the continuous production of bimodal polyethylene copolymers.

Figure 2:
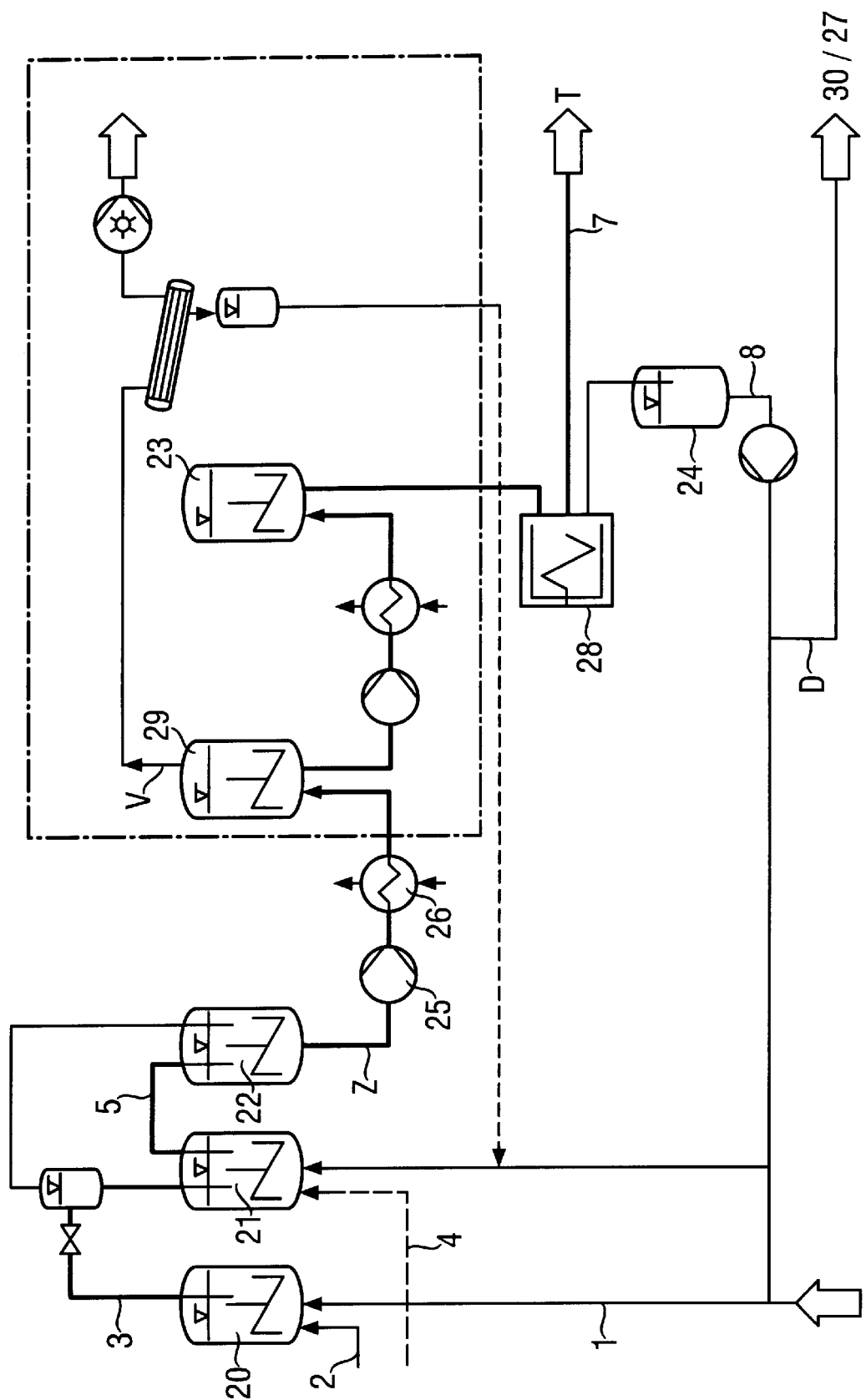
FIG. 2 shows the flow diagram of the suspension polymerization process using isooctane as dispersion medium.

In FIG. 2, the polymerization conditions in the reactors 20, 21 and 22 correspond to those in FIG. 1. The process of concentration of the suspension stream (Z) with respect to isooctane as dispersion medium is undertaken in stirred vessel 29 at a reduced pressure of about 0.32 bar and at a temperature which is only slightly different from the reaction temperature for hexane as dispersion medium, but higher than it, of about 70° C., established by means of the heat exchanger 26. The condensed, wax-free and butene-containing vapor stream (stream V) is introduced into the second reactor 21. The stream of dispersion medium material, after cooling to 35° C. in the receiver 23 for the decanter and mechanical removal of liquid in the decanter 28, is reintroduced into the first and second reactors (20 and 21) up to a proportion (D) of from 5 to 12% by weight, based on the stream (Z) coming from the after-reactor 22. Other separations take place as in FIG. 1.

In order to obtain an appropriate vapor stream (V), heat in the heat exchanger 26 is fed to the evaporation procedure.

EXAMPLES

Table 1 gives the operating data for a continuously operated polymerization system with a throughput of 50 kg/h. The dispersion medium is hexane. If the system is operated without reduced pressure (Example 2) there is no partial evaporation (stream V=0); this is taken as an example for comparison with the subject-matter of the invention (Example 1).

TABLE 1

|  | Example 1 | Example 2 (comparison) |
|---|---|---|
| $C_2H_4$ gas feed [kg/h] | 50 | 50 |
| $H_2$ gas feed [Nl/h] | 465 | 450 |
| $C_4H_8$ gas feed [g/h] | 1500 | 1950 |
| Dispersion medium [l/h] (stream Z) | 250 | 250 |
| Receiver 23 for the decanter |  |  |
| Pressure [mbar] | 340 | 1030 |
| Temperature [° C.] | 34 | 62 |
| Cond. vapors [l/h] | 102 | 0 |
| Phase ratio [kg PE/l of Dm*] (flow from receiver for the decanter) | 1:3 | 1:5 |
| $C_4H_8$ conc. Vapors [% by weight] | 2.3 | — |
| $C_4H_5$ conc. [% by weight] (stream 6) | 0.2 | 0.75 |
| Amount of wax discharged [g/h] | 469 | 675 |
| Wax content in Dm*[% by weight] (stream 6) | 1.0 | 1.4 |

*Dispersion medium

Table 2 gives the properties of the polymers from Examples 1 and 2 (comparison).

TABLE 2

|  | Example 1 | Example 2 (comparison) |
|---|---|---|
| Melt index |  |  |
| MFR 190/5 g/10 min (ISO 1133) | 0.42 | 0.47 |

TABLE 2-continued

|  | Example 1 | Example 2 (comparison) |
|---|---|---|
| FRR* | 25.8 | 23.5 |
| Viscosity (ISO 1191) [ml/g] | 320 | 314 |
| Density (DIN 53479, ASTM D1505) [g/cm³] | 0.950 | 0.951 |
| Notched impact strength |  |  |
| Charpy (ISO 179/1eA) [kJ/mm²] | 17.4 | 15.7 |
| Wax content for |  |  |
| C7 extraction [% by weight] | 7.5 | 4.5 |
| C6 extraction [% by weight] | 1.3 | 1.0 |
| TGA** 150° C., 1 h [ppm] | 4030 | 5370 |
| Volatile constituents [mg/8 kg] | 29 | 30 |

*Melt index ratio 190/21.6 g/10 min to 190/5 g/10 min
**TGA thermogravimetric analysis (ISO 11358)

Table 3 gives the selectivity of wax attachment and the processing advantages associated therewith.

Example 3 gives the properties of an ethylene copolymer in which, as a result of the measure on which the invention is based, a higher proportion of the wax dissolved in the dispersion medium has been adsorbed onto the solid polyethylene copolymer in the receiver 23 for the decanter.

Example 4 establishes the properties of an ethylene copolymer in which the entire amount of wax produced in the polymerization process and dissolved in the dispersion medium was subsequently resprayed onto the product (comparison).

TABLE 3

|  | Example 3 | Example 4 (comparison) |
|---|---|---|
| Receiver 23 for the decanter |  |  |
| Pressure [mbar] | 340 | 1030 |
| Cond. vapors [l/h] | 102 | 0 |
| Phase ratio [kg of PE/l of Dm] (stream 6) | 1:3 | 1:5 |
| Volatile constituents [mg/8 kg] | 29 | 56 |
| Processing | no fuming | fuming |

Measurement Apparatus for Volatile Constituents

Since there is no standard specification for measuring volatile constituents, the test method is described below.

8 kg of polyethylene pellets are extruded to give a tube with a diameter of approximately 45 mm, which is conducted through the orifice in a cooled base plate (external diameter 184 mm, internal diameter 50 mm, cooling surface 246 cm²).The sides of the base plate are screened off by a 250 mm cylindrical guide plate, so that the base plate and the guide plate form a partially open space. The fumes discharged from the extruded tube are condensed on a cooled photographic plate secured to the base plate. This material precipitated on the removable photographic plate is weighed and serves as a quantitative measure of formation of fumes. Cooling water temperature from 7 to 10° C.
Extrusion melt temperature from 225 to 229° C.

What is claimed is:

1. A process for preparing ethylene copolymers by polymerizing ethylene with, as comonomer, up to 10% by weight, based on the total amount of the monomers, of a 1-olefin of the formula R—CH=CH$_2$, where R is a straight-chain or branched alkyl radical having from 1 to 4 carbon atoms, in a polymerization reactor and in suspension with a dispersion medium at a temperature of from 20 to 100° C. and a pressure of from 2 to 20 bar, in the presence of a catalyst, followed by separation of the dispersion medium from the polymer, which comprises, after carrying out the polymerization and before removing the dispersion medium from the polymer, partly evaporating the suspension stream, with the result that some portion of the wax formed in the polymerization is adsorbed onto the polymer, and feeding the resultant vapor stream directly into the reactor after condensation or back into the reactor after distillative removal of the comonomer.

2. The process as claimed in claim 1, wherein the process is operated continuously and is carried out in at least two reaction steps with at least one reactor in each.

3. The process as claimed in claim 1, wherein the adsorbed wax is composed of oligomers above C-24.

4. The process as claimed in claim 3, wherein the adsorbed wax is composed of oligomers above C-30.

5. The process as claimed in claim 4, wherein the adsorbed wax is composed of oligomers above C-40.

6. The process as claimed in claims 1, wherein, during the partial evaporation, from ⅕ to ½ of the dispersion medium is drawn off as vapor.

7. The process as claimed in claim 6, wherein, during the partial evaporation, from ¼ to ⅓ of the dispersion medium is drawn off as vapor.

8. The process as claimed in claim 6, wherein the evaporation takes place at reduced pressure of from 0.1 to 0.8 bar.

9. The process as claimed in claim 8, wherein the pressure during the evaporation is from 0.3 to 0.5 bar.

10. The process as claimed in claim 1, wherein the partial evaporation is undertaken adiabatically utilizing the latent heat of the suspension stream.

11. The process as claimed in claim 1, wherein the partial evaporation is undertaken adiabatically by introducing heat.

12. The process as claimed in claim 1, wherein the process is carried out in at least first and second reaction steps including first and second reactors, and at least a part of the vapor stream, with the monomers and comonomers present therein, is fed into the second reactor.

13. The process as claimed in claim 12, wherein, in the case of partial return, the remainder of the vapor stream undergoes a distillation of dispersion medium.

14. The process as claimed in claim 1, wherein the comonomer concentration in the first reactor of is set at from 0 to 0.04% by weight.

15. The process as claimed in claim 14, wherein the comonomer concentration in the first reactor is set at from 0 to 0.03% by weight.

16. The process as claimed in claim 14, wherein the comonomer used is 1-butene.

17. The process as claimed in claim 1, wherein the dispersion medium used is saturated hydrocarbons with a boiling point (at 1 bar) of above 60° C.

18. The process as claimed in claim 17, wherein the dispersion medium used is hexane, isooctane or nonane.

* * * * *

UNITED STATES PATENT AND TRADEMARK OFFICE
CERTIFICATE OF CORRECTION

PATENT NO. : 6,204,345 B1
DATED : March 20, 2001
INVENTOR(S) : Joachim Berthold et al.

It is certified that error appears in the above-identified patent and that said Letters Patent is hereby corrected as shown below:

Column 3,
Last line "(stream VR)" should read -- (stream$V_R$) --.

Column 4,
Line 1, "stream (VD)" should read -- stream ($V_D$) --.
Line 53, (TABLE 1), "$C_4H_5$" should read -- $C_4H_8$ --

Signed and Sealed this

Fifteenth Day of January, 2002

Attest:

Attesting Officer

JAMES E. ROGAN
Director of the United States Patent and Trademark Office